Patented Dec. 14, 1948

2,455,995

UNITED STATES PATENT OFFICE 2,455,995

PRODUCTION OF NITRILES FROM CERTAIN OLEFINS AND HCN

Charles R. Harris, Lockport, and Wilbur W. De Atley, Niagara Falls, N. Y., assignors to E. I. du Pont de Nemours & Company, Wilmington, Del., a corporation of Delaware No Drawing. Application July 5, 1947, Serial No. 759,300

17 Claims. (Cl. 260—465.3)

This invention relates to the production of nitriles and more particularly to a new catalytic process for the production of nitriles from olefinic hydrocarbons and hydrogen cyanide and to certain new compounds obtained thereby.

This application is a continuation-in-part of our application, Serial No. 521,666 filed February 9, 1944, now abandoned.

Nitriles have previously been produced by converting olefins to alkyl sulfates or halides and reacting the latter with an alkali metal cyanide. More recently, there has been disclosed in U. S. P. 2,385,741, a process wherein olefins are reacted with hydrogen cyanide utilizing elevated temperature and pressure in the presence of dispersed metal catalyst, preferably copper or cobalt. The former indirect process obviously is undesirable and expensive for commercial operation. The latter process requires elevated pressures and high temperatures, for example, the preferred operating temperatures are 400 to 750° C. Furthermore, the yields obtained are very low.

It is one of the objects of this invention to provide a novel process for the production of nitriles. Another object is to provide a new and improved process for the conversion of olefinic hydrocarbons to nitriles. A further object is to provide a new catalytic process for producing nitriles by the reaction of olefins with hydrogen cyanide in which good yields are obtained. Another object is to provide novel nitriles which are useful as chemical intermediates. These and other objects will be apparent from the ensuing description of the invention.

The above objects are attained in accordance with our invention which comprises reacting certain olefinic hydrocarbons with hydrogen cyanide in the vapor phase in the presence of a catalyst consisting of activated alumina, titania, silica, magnesium silicate or mixtures thereof at 250 to 500° C.

The hydrocarbons which may be utilized in accordance with the invention are those hydrocarbons containing not more than 10 carbon atoms in the molecule and having an aliphatic carbon chain containing one double bond, said double bond linking a tertiary carbon atom to another carbon atom which may be primary, secondary or tertiary, and hydrocarbons containing 3 to 6 carbon atoms in the molecule and having one double bond, said bond linking a secondary carbon atom to another carbon atom which may be primary or secondary.

Illustrative of those hydrocarbons having a double bond linking a tertiary carbon atom to another carbon atom which are satisfactory in practicing the invention are:

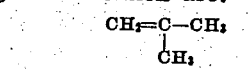

Isobutene

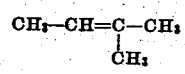

Trimethyl ethylene

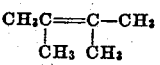

Tetramethyl ethylene

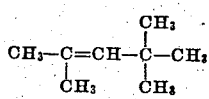

Diisobutylene

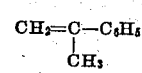

Alpha-methylstyrene

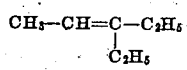

3-ethylpentene-2

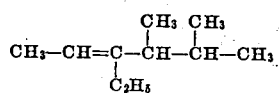

4,5-dimethyl-3-ethylhexene-2

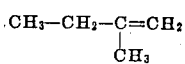

2-methyl butene-1

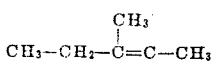

3-methyl pentene-2

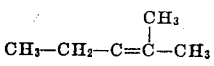

2-methyl pentene-2

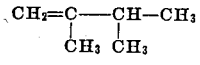

2,3-dimethyl butene-1

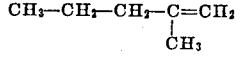

2-methyl pentene-1

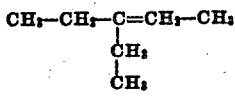

3-ethyl pentene-2

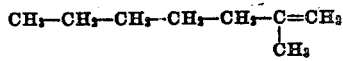

2-methyl heptene-1

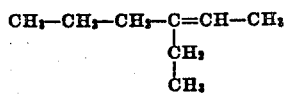

3-ethyl hexene-2

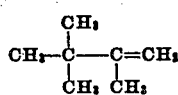

2,2,3-trimethyl butene-3

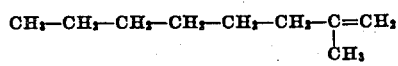

2-methyl octene-1

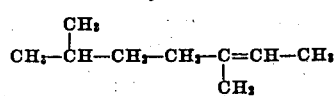

2-methyl-5-ethyl-heptene-5

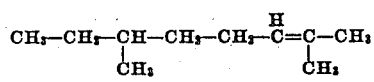

2,6-dimethyl octene-2

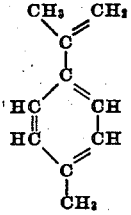

p-Methyl alpha methyl styrene

Illustrative of those hydrocarbons containing 3 to 6 carbon atoms and having a double bond linking a secondary carbon atom to another carbon atom are:

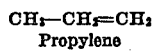
Propylene

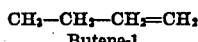
Butene-1

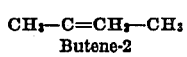
Butene-2

Pentene-1

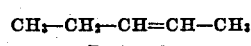
Pentene-2

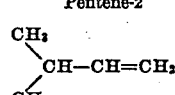
3-methyl butene-1

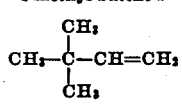
3,3-dimethyl butene-1

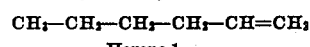
Hexene-1

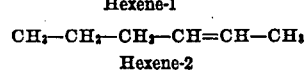
Hexene-2

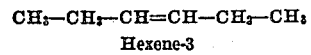
Hexene-3

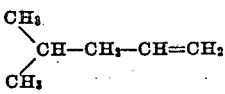
4-methyl pentene-1

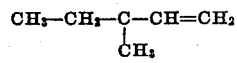
3-methyl pentene-1

In operating our novel process, the hydrocarbon vapor and hydrogen cyanide vapor may be passed together over the catalyst in a heated reactor and the temperature so controlled that the temperature within the catalyst mass is within the range of 250 to 500° C. Although the process may be operated successfully to produce nitriles at any temperature within the range of 250 to 500° C., we have discovered that optimum results, when utilizing hydrocarbons having a double bond linking a tertiary carbon atom, are obtained at temperatures of 380 to 400° C., and it is preferred to operate the invention within this range. Not only are the highest yields and conversions obtained at 380 to 400° C. but also the catalyst is maintained at a high degree of activity for a longer time before it becomes necessary to regenerate the catalyst. When hydrocarbons having a double bond linking a secondary carbon atom are utilized, the preferred temperatures for optimum results are about 25 to 50° C. higher. For example, we have discovered that although fair yields may be obtained when operating near the extremes of the 250 to 500° range, the catalyst tends to lose activity rapidly and therefore must be regenerated frequently if satisfactory operation is to be obtained.

The catalysts which are useful in the operation of our invention are alumina, titania, silica and magnesium silicate, in activated form, i. e. having surface active properties and which may be prepared by well-known methods, for example by precipitation as the hydrated material followed by dehydration under controlled conditions. Examples of these surface active forms are alumina gel and titania gel. The catalysts may be mixed with each other for use in our invention, impregnated upon each other or co-precipitated and in the claims the term "mixtures" is intended to include within its scope mixtures of any two or more of the catalysts thus obtained. We prefer to utilize activated alumina and any of the various grades of activated alumina available on the open market are satisfactory. We have found that activated alumina containing a high proportion of gamma-alumina is particularly suitable. We prefer to utilize activated alumina as this material is readily available, its use results in high yields and conversions and this catalyst may be regenerated repeatedly without detectable losses in activity.

Preferably, we utilize the activated catalysts of our invention without the addition of other materials. However, substances having no adverse effect on the reaction and which do not cause polymerization of the hydrogen cyanide may be added if desired. The catalysts may be in powdered form or may be used in the form of beads or lumps when a system utilizing a stationary catalyst is used. On the other hand, when a fluid catalyst system is employed, the catalyst size should be such as to permit fluidization under the conditions utilized. For example, we have found that 80 to 150 mesh alumina is entirely satisfactory when using a fluid catalyst system.

In general, we have found that for the best operation, the catalyst should be regenerated periodically. When operating with a stationary catalyst, we have, for example, found it satisfactory to regenerate the catalyst after about 5 hours' operation. The regeneration may be simply accomplished by burning out with air at 500 to 550° C. If the temperature is lower than 500° C., the regeneration may be incomplete and result in a somewhat lower catalyst activity. No loss in catalyst activity has been noted after burning out 25 to 30 times. When a fluid catalyst system is employed, we have found that for best results the catalyst in general requires regeneration after 1½ to 3 hours; and catalysts thus frequently regenerated have been used in such a system during approximately 400 hours of operation without a detectable loss in activity.

The ratio of hydrocarbon to hydrogen cyanide may be varied over a wide range with successful results. However, we have found it necessary for best results to utilize a considerable excess of hydrocarbon, and we prefer to utilize the reactants in the ratio of at least 3 moles of hydrocarbon for each mole of hydrogen cyanide. We have found that a molecular ratio of 6 moles of hydrocarbon for each mole of hydrogen cyanide is satisfactory. A diluent gas, for example, hydrogen or nitrogen may be utilized if desired, but we have found that the utilization of excess hydrocarbon usually makes it unnecessary to use a diluent gas.

The process of this invention may be operated above or below atmospheric pressure with good results. However, we have found that operation at atmospheric pressure is entirely satisfactory, and it is preferred to carry out the process at atmospheric pressure.

In a preferred method of operating our invention, we utilize the well-known fluid catalyst technique as described, for example, in Pier, U. S. P. 1,845,058. We have found that higher conversions and yields are thus obtained and that the process may be operated with higher space-time-yields than with a stationary catalyst bed. Thus, we may carry out the process of our invention by passing the hydrocarbon vapors and hydrogen cyanide vapors into a vertical reactor containing the desired catalyst in finely divided form at such a rate that the catalyst is maintained suspended in the reactor in a fluidized state. The optimum conditions described above for operation of the process with a stationary catalyst also may be utilized in the fluidized system.

Since it is desirable, in order to obtain the best results, to utilize an excess of hydrocarbon, it becomes necessary for most economical operation to recycle the unconverted hydrocarbon issuing from the reactor when utilizing either stationary or a fluid catalyst. However, we have found that a small amount of by-product ammonia is always present, and if this is not removed, it usually causes plugging of the recycle system with ammonium salts. We have, therefore, found it desirable to remove ammonia by scrubbing the gas being recycled with an acid material, for example, sulfuric acid or ammonium acid sulfate, prior to passage back into the reactor.

The products which are obtained in accordance with our novel process when reacting diisobutylene and tetramethylethylene with hydrogen cyanide are new compounds.

The product obtained from the reaction of hydrogen cyanide with diisobutylene is dimethyl neopentyl acetonitrile having the formula:

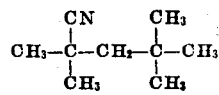

and having a boiling point, at 760 mm. of mercury, of 178° C., a refractive index, $n_D^{25}$ 1.4230. The theoretical nitrogen content is 10.07%. Analysis of a sample showed an actual nitrogen content of 10.06%.

Alpha, alpha, beta-trimethyl butyronitrile, the new compound obtained by reacting tetramethylethylene with hydrogen cyanide which has the formula:

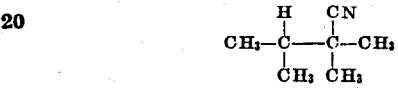

and has a boiling point, at 760 mm. of mercury, of 152° C. and a refractive index $n_D^{25}$ 1.4100. The calculated nitrogen content is 12.64% and analysis showed the product to contain 12.59% nitrogen.

The following examples illustrate our invention:

Example 1

A mixture of hydrocyanic acid vapor and isobutene was passed through a bed of alumina gel, which had been dried at 400° C., at the rates of 500 cc. per minute of hydrocyanic acid and 750 cc. per minute of isobutene. The temperature in the catalyst bed was maintained at 350 to 400° C. The off-gases were condensed and trimethyl acetonitrile was recovered from the condensate by distillation.

After 3.5 hours, the process was stopped and the alumina catalyst was heated in air at 700 to 800° C. to completely burn out organic material. The catalyst then was used in a succeeding run according to the above procedure.

In this manner, four successive runs were carried out, with the following results:

| Run | Time | Yield [1] |
|---|---|---|
| | | Per cent |
| 1 | 3.5 | 45.6 |
| 2 | 3.5 | 54.5 |
| 3 | 3.0 | 51.2 |
| 4 | 3.5 | 51.4 |

[1] Net yield of trimethyl acetonitrile, based on HCN used.

Example 2

A bed of 300 cc. of freshly prepared granular alumina gel was dried by heating in a current of nitrogen at 400° C. A mixture of equal volumes of hydrocyanic acid vapor and isobutene was then passed through the alumina bed at a temperature of 360 to 410° C. and at the rate of 1000 cc. per minute. The yield of trimethyl acetonitrile was 55.3%, based on the HCN used.

Example 3

A catalyst consisting of 300 cc. of 4–10 mesh activated alumina was placed in a 37 mm. i. d. x 30″ quarts tube in a furnace and dried in a current of nitrogen for 3–4 hours at 400° C. A gas mixture of 550 cc. of isobutene, 250 cc. of hydrogen and 140 cc. of hydrogen cyanide was passed over this catalyst for five hours while the "hot spot" of the catalyst was maintained at 380–400° C. The hydrogen was merely used as a vehicle for volatilizing a known amount of hydrogen cyanide per minute by bubbling it through a hydrogen cyanide reservoir at 0° C.

The product was collected by condensing in a water cooled condenser, an ice trap and a dry-ice trap. The hydrogen was allowed to escape through a caustic trap. The isobutene that condensed with the product was allowed to warm up and evaporate through the caustic trap. The crude product, trimethylacetonitrile, remaining, was washed several times with dilute caustic to free it from hydrogen cyanide. Weight of trimethylacetonitrile recovered, 99.5 g. The caustic trap and washings were analyzed for hydrogen cyanide and gave 3.7 g. of recoverable hydrogen cyanide. A total of 55.5 g. of hydrogen cyanide was used as determined by weighing the vaporizer before and after the run. The conversion and net yield based on hydrogen cyanide were 58.5% and 62.5%, respectively. The product was dried and distilled at atmospheric pressure. Practically all of it distilled over as pure trimethylacetonitrile boiling at 104–105° C. and melting at 17–18° C.

*Example 4*

A reaction similar to Example 3 was carried out with a stainless steel tube of the same dimensions as the quartz tube. 300 cc. of activated alumina was placed in the tube and dried for 2½ hours at 380–400° C. in hydrogen. A gas mixture of 550 cc. of isobutene, 250 cc. of hydrogen and 200 cc. of hydrogen cyanide per minute was passed over the catalyst for 5¾ hours with the "hot spot" maintained at 395–415° C. The product was collected and purified as in Example 3. A total of 138 g. of trimethylacetonitrile was separated from the caustic wash. A total of 98 g. of hydrogen cyanide was vaporized and 26.1 g. recovered. Conversion based on hydrogen cyanide was 45.8% and net yield 62.4%. The product was pale yellow and was purified by simple distillation as in Example 3.

*Example 5*

Example 3 was repeated except that the hydrogen cyanide was metered as a liquid and vaporized in a heated flask without the use of hydrogen. The "hot spot" of the catalyst was maintained at 365–418° C. for four hours while 550 cc./min. of isobutene was added and a total of 70 g. of hydrogen cyanide was added fairly evenly over the four hour period. There was obtained 90 g. of trimethylacetonitrile and 7.5 g. of hydrogen cyanide was recovered. Conversion based on hydrogen cyanide was 42% and net yield 47%.

*Example 6*

In a reactor similar to that used in Example 3, was placed 300 cc. of activated alumina. After drying, a mixture of 250 cc. hydrogen, 200 cc. hydrogen cyanide and approximately 400 cc. of alpha-methyl styrene per minute were fed as a vapor mixture. The alpha-methyl styrene was vaporized into the hydrogen and hydrogen cyanide gas just before the reactor. The catalyst was maintained at 380–403° C. and the gas mixture passed through for 3¾ hours. Total hydrogen cyanide fed was 63 g. and 11.1 g. was recovered. The product was washed free of hydrogen cyanide with caustic and purified by fractional distillation whereupon 84 g. of phenyl dimethylacetonitrile boiling at 100–106° C. at 15 mm. was obtained. Conversion based on hydrogen cyanide, 24.7% and net yield, 30.0%.

*Example 7*

Example 6 was repeated with diisobutylene substituted for alpha-methyl styrene. The catalyst was held at 390–410° C. for six hours. A total of 97.5 g. of hydrogen cyanide and 580 cc. of diisobutylene was fed during this time. The product was purified by fractional distillation, 36.1 g. of the nitrile from diisobutylene boiling at 172–183° C. was obtained. 20.65 g. of hydrogen cyanide were recovered, conversion based on hydrogen cyanide was 7.2% and net yield 9%. The purified nitrile, a new compound, has B. P. (760) 178–179° C.; $N_D^{25}$ 1,4230; nitrogen, calc. 10.07%, found 10.01%, 10.10%.

*Example 8*

Example 3 was repeated except that 300 cc. of 6–10 mesh activated titania was used as catalyst instead of the alumina. The gas feed had essentially the same composition as in Example 6. A total of 84 g. of hydrogen cyanide was fed during 4.8 hours at 387–445° C. and 37.7 g. was recovered. 18.5 g. of trimethylacetonitrile was produced. Based on hydrogen cyanide, conversion was 7.2% and net yield 13.0%.

*Example 9*

Example 3 was repeated with 300 cc. of activated silica gel instead of alumina gel as catalyst. It was operated at 390–415° C. for five hours with a gas feed composition similar to Example 3. A total of 101 g. of hydrogen cyanide was fed during this time and 79.0 g. was recovered. A total of 3.3 g. of trimethylacetonitrile was produced which, based on hydrogen cyanide, is a conversion of 1.1% and net yield of 4.6%.

*Example 10*

An apparatus similar to that used in Example 3 was charged with 300 cc. of activated alumina and operated 6¼ hours at 430–505° C. while a mixture of 250 cc. of hydrogen, 200 cc. of hydrogen cyanide and 550 cc. of propylene was passed over the catalyst. A total of 78.5 g. of hydrogen cyanide was fed and 32.5 g. recovered. Total product after purification was 22.5 g. of isobutyronitrile making a conversion of 11.2% and a net yield of 19.9% based on hydrogen cyanide.

*Example 11*

The apparatus of Example 10 was operated with 300 cc. of activated alumina at 370–408° C. while a mixture of 250 cc. of hydrogen, 200 cc. of hydrogen cyanide and 550 cc. of butene-2 was passed through for 5.1. hours. Total hydrogen cyanide feed was 68 g. and 45.6 g. were recovered. Total product was 6.0 g. of methyl ethyl acetonitrile making a conversion of 2.9% and a net yield of 8.7% based on hydrogen cyanide.

*Example 12*

The preceding example was repeated but butene-1 instead of butene-2 was used. It was operated at 420–450° C. for 2 hours. Total hydrogen cyanide fed was 27.5 g. of which 4.3 g. were recovered. A total of 11.7 g. of methyl ethyl acetonitrile was produced with a conversion of 13.6% and net yield of 16% based on hydrogen cyanide.

*Example 13*

Example 6 was repeated except that 350 cc. of trimethylethylene was used instead of the alpha-methyl styrene. The catalyst was operated at 380–418° C. for three hours. A total of 50 g. of hydrogen cyanide was added and 8.0 g. recovered. Total product after purification by distillation was 52 g. of dimethyl ethylacetonitrile giving a conversion of 34.5% and a net yield of 40.7% based on hydrogen cyanide.

Example 14

Example 6 was repeated except that 330 cc. of tetramethylethylene was substituted for the alpha-methyl styrene. The catalyst was held at 375–407° C. for 5½ hours and a total of 79 g. of hydrogen cyanide was fed along with the tetramethylethylene. Hydrogen cyanide recovery was 13.9 g. and after purification by distillation, 87.2 g. of product, alpha, alpha, beta-trimethyl butyronitrile, was obtained. This is a conversion of 26.8% and a net yield of 32.6% based on hydrogen cyanide. This is a new product, B. P. 152°; $N_D^{25}$ 1.4100, nitrogen, calc. 12.64, found, 12.60%, 12.62%.

Example 15

Example 3 was repeated in general except that 300 cc. of 6–8 mesh activated magnesium silicate was used. The catalyst was dried under nitrogen for 4 hours and operated for 5 hours at 375–397° C. A total of 85.5 g. of hydrogen cyanide was vaporized. A total of 66.4 g. of hydrogen cyanide was recovered and 37.1 g. of trimethylacetonitrile was produced. Conversion was 14.1% and net yield 63.2%, based on hydrogen cyanide.

Example 16

This preparation was carried out in a fluid catalyst reactor consisting of a 2½" i. d. glass tube 4' long with a conical bottom and inverted cone top. Exit gases passed through a small glass cyclone separator to remove any fine catalyst particles carried from the reactor. The reactor was placed in an electrical furnace for heat control. The reactants were fed as a vapor into the bottom of the reactor at the rate of 14–20 liters per minute. Trimethylacetonitrile and hydrogen cyanide were recovered from the product gases as described with the stationary bed catalysts. The hydrogen cyanide was vaporized by passing a known volume of hydrogen through liquid hydrogen cyanide held at a constant temperature. For these experiments the reactor was charged with approximately 1500 cc. of activated gamma-alumina of 80–150 mesh. In this experiment a total of 360 g. of hydrogen cyanide and approximately 4200 g. of isobutene were passed through the reactor in a ratio of 1 mole of hydrogen cyanide to 6 moles of isobutene while the catalyst was maintained at 385–395° C. The product contained 638 g. of trimethylacetonitrile and 115 g. of hydrogen cyanide was recoverable. Based on hydrogen cyanide, the conversion was 57.8% and net yield 84.7%.

During this period of reaction of about 2 hours, the catalyst had become partially deactivated. Full activity was restored by passing air through the catalyst until the carbon containing deposit was burned off. This was carried out at 500–550° C. for one hour.

Example 17

Using the regenerated catalyst from Example 16 and operating in a similar manner, 288 g. of hydrogen cyanide and 3620 g. of isobutene were passed through the reactor in the ratio of approximately 1 mole of hydrogen cyanide to 6.1 moles of isobutene for a two-hour period. 530 g. of trimethylacetonitrile was obtained from the product and 83.2 g. of hydrogen cyanide was recoverable. Based on hydrogen cyanide, conversion was 59.8% and net yield 84.2%.

Example 18

For this experiment a stainless steel reactor of approximately the same dimensions as the glass reactor was used except that it contained a series of stainless steel baffles constructed of ¼" mesh wire and spaced three inches apart. It had a stainless steel cyclone in the exit gas line and was preceded by a stainless steel preheater for raising the temperature of the feed gases to 250–300° C. Operating conditions and catalyst were essentially the same as those for the glass reactor.

During a two-hour period 340.7 g. of hydrogen cyanide and 3740 g. of isobutene were fed in approximately a molar ratio of 1:5.5. From the product 792 g. of trimethylacetonitrile was obtained and 149.3 g. of hydrogen cyanide was recoverable. Based on hydrogen cyanide, conversion was 52.6% and net yield 83.0%. The catalyst was regenerated by burning off carbon deposits as described under Example 3.

Example 19

The reactor described under Example 18 and the same catalyst and general operating procedure was used in reacting 499 g. of hydrogen cyanide and 4200 g. of isobutene over a two-hour period. The molar ratio of hydrogen cyanide to isobutene in the feed was approximately 1:4.3. During this period 740 g. of trimethylacetonitrile was obtained and 174.5 g. of hydrogen cyanide was recoverable. Based on hydrogen cyanide, conversion was 48.2% and net yield 74.2%.

We claim:

1. Process for the production of nitriles which comprises reacting a compound from the group consisting of hydrocarbons containing not more than 10 carbon atoms and having an aliphatic chain containing one double bond, said double bond linking a tertiary carbon atom to another carbon atom and hydrocarbons containing 3 to 6 carbon atoms and having one double bond said bond linking a secondary carbon atom to another carbon atom with hydrogen cyanide in the vapor phase in the presence of a non-metallic catalyst selected from the group consisting of activated alumina, silica, titania, magnesium silicate and mixtures thereof at 250–500° C. under substantially atmospheric pressure.

2. The process of claim 1 in which the reaction is carried out at 380–400° C.

3. The process of claim 1 in which the molecular ratio of hydrocarbon to hydrogen cyanide is at least 3 to 1.

4. The process of claim 2 in which the catalyst is activated alumina.

5. The process of claim 2 in which the catalyst is activated silica.

6. The process of claim 2 in which the catalyst is activated magnesium silicate.

7. The process of claim 2 in which the catalyst is activated alumina and the hydrocarbon is isobutene.

8. The process of claim 2 in which the catalyst is activated alumina and the hydrocarbon is diisobutylene.

9. The process of claim 2 in which the catalyst is activated alumina and the hydrocarbon is tetramethyl ethylene.

10. The process of claim 2 in which the catalyst is maintained in a fluidized state throughout the reaction period.

11. The process of claim 2 in which the hydrocarbon vapor and hydrogen cyanide vapor is passed into a reactor at a rate sufficient to maintain the catalyst in a fluidized state.

12. The process of claim 2 in which unreacted hydrocarbon is freed from ammonia and recycled.

13. The process of claim 10 in which unreacted hydrocarbon is freed from by-product ammonia by scrubbing with an acidic material and recycled.

14. The process for the production of trimethyl acetonitrile which comprises reacting hydrocyanic acid with isobutene in the vapor phase at a temperature of about 380 to 400° C. in the presence of a non-metallic catalyst comprising alumina under substantially atmospheric pressure.

15. The process for the production of trimethyl acetonitrile which comprises reacting hydrocyanic acid with isobutene in the vapor phase at a temperature of about 380 to 400° C. in the presence of alumina gel under substantially atmospheric pressure.

16. The process for the production of trimethyl acetonitrile which comprises passing a gaseous mixture containing hydrocyanic acid and isobutene, in the proportion of at least one mole of isobutene for each mole of hydrocyanic acid, over a non-metallic catalyst comprising alumina gel at a temperature of about 380 to 400° C. under substantially atmospheric pressure.

17. The process for the production of trimethyl acetonitrile which comprises passing a gaseous mixture containing hydrocyanic acid and isobutene, in the proportion of about 3 moles of isobutene for each mole hydrocyanic acid, over alumina gel at a temperature of about 380 to 400° C. under substantially atmospheric pressure.

CHARLES R. HARRIS.
WILBUR W. DE ATLEY.

REFERENCES CITED

The following references are of record in the file of this patent:

UNITED STATES PATENTS

| Number | Name | Date |
| --- | --- | --- |
| 2,353,091 | Slotterbeck et al. | July 4, 1944 |
| 2,385,741 | Teter | Sept. 25, 1945 |
| 2,432,532 | Mahan | Dec. 16, 1947 |
| 2,445,693 | Porter et al. | July 20, 1948 |

FOREIGN PATENTS

| Number | Country | Date |
| --- | --- | --- |
| 463,123 | Germany | July 23, 1928 |
| 583,607 | Great Britain | Dec. 20, 1946 |
| 728,241 | France | July 2, 1932 |

OTHER REFERENCES

Haller et al., Compt. rend., vol. 149, page 6 (1909).

Haller et al., Compt. rend., vol. 158, page 302 (1914).

Ziegler et al., Chem. Abstracts, vol. 26, page 3776, (1932).